US012056071B2

(12) United States Patent
Son et al.

(10) Patent No.: US 12,056,071 B2
(45) Date of Patent: Aug. 6, 2024

(54) DETERMINING ALLOCATION OF LANES OF A PERIPHERAL-COMPONENT INTERCONNECT-EXPRESS PORT TO LINKS

(71) Applicant: Microchip Technology Incorporated, Chandler, AZ (US)

(72) Inventors: Eric Son, Port Coquitlam (CA); Robert Kristian Watson, Burnaby (CA); May Stewart, Burnaby (CA); Edward Loo, Vancouver (CA)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 17/817,906

(22) Filed: Aug. 5, 2022

(65) Prior Publication Data

US 2023/0037421 A1 Feb. 9, 2023

Related U.S. Application Data

(60) Provisional application No. 63/260,035, filed on Aug. 6, 2021.

(51) Int. Cl.
*G06F 13/22* (2006.01)
(52) U.S. Cl.
CPC ...... *G06F 13/22* (2013.01); *G06F 2213/0026* (2013.01)
(58) Field of Classification Search
CPC .................. G06F 13/22; G06F 2213/0026
See application file for complete search history.

(56) References Cited

U.S. PATENT DOCUMENTS

| | | | | |
|---|---|---|---|---|
| 7,756,123 | B1* | 7/2010 | Huang | G06F 13/4022 370/359 |
| 2007/0011536 | A1* | 1/2007 | Khanna | G06F 11/27 714/E11.169 |
| 2007/0233930 | A1* | 10/2007 | Gallagher | G06F 13/4018 710/307 |
| 2020/0192850 | A1* | 6/2020 | Caruk | G06F 13/4221 |
| 2020/0226084 | A1* | 7/2020 | Das Sharma | H04L 45/24 |
| 2021/0026797 | A1* | 1/2021 | Barbiero | G06F 13/4282 |
| 2022/0374384 | A1* | 11/2022 | Jeon | G06F 13/4221 |

(Continued)

OTHER PUBLICATIONS

Published Version of PCI Express® Base Specification Revision 5.0, Version 1.0, May 22, 2019.

(Continued)

*Primary Examiner* — Glenn A. Auve
(74) *Attorney, Agent, or Firm* — TraskBritt

(57) ABSTRACT

Examples disclosed herein include a method including transmitting, via respective lanes of a number of lanes of a peripheral component interconnect express (PCIe) port, a respective lane identifier. The method may also include receiving, via the respective lanes of the number of lanes of the PCIe port, respective further lane identifiers. The method may also include determining which of the number of lanes to allocate to a link for communicating with a device coupled to the PCIe port at least partially responsive to the respective further lane identifiers. The method may also include allocating the determined lanes of the number of lanes to the link. Related devices and systems are also disclosed.

20 Claims, 10 Drawing Sheets

(56) References Cited

U.S. PATENT DOCUMENTS

2022/0382705 A1* 12/2022 Jeon .................... G06F 13/4221

OTHER PUBLICATIONS

International Search Report for International Application No. PCT/US2022/074626, mailed Nov. 8, 2022, 5 pages.
International Written Opinion for International Application No. PCT/US2022/074626, mailed Nov. 8, 2022, 7 pages.
PCI Express, "PCI Express Base Specification Revision 3.0", https://komposter.com/ua/documents/PCI_Express_Base_Specification_Revision_3.0.pdf (Nov. 10, 2010) 377 pages.

* cited by examiner

DETERMINING ALLOCATION OF LANES OF A PERIPHERAL-COMPONENT INTERCONNECT-EXPRESS PORT TO LINKS

CROSS-REFERENCE TO RELATED APPLICATIONS

This application claims the benefit of the priority date of U.S. Provisional Patent Application No. 63/260,035, filed Aug. 6, 2021, and titled "AUTOMATICALLY BIFURCATING PERIPHERAL COMPONENT INTERCONNECT EXPRESS LANES," the disclosure of which is incorporated herein in its entirety by this reference.

TECHNICAL FIELD

This description relates, generally, to determining allocation of lanes of a peripheral component interconnect express (PCIe) port to links. More specifically, some examples relate to determining allocation lanes of a PCIe port of a PCIe switch for links with devices on a card communicatively coupled to the PCIe port, without limitation. Further, some examples relate to allocating the determined lanes for the links, without limitation.

BACKGROUND

The peripheral component interconnect express (PCIe) specification defines operations for devices connected by PCIe ports to reach an L0 state (which may be a "link up" state, which may be a state in which the devices may communicate via the link). In the present disclosure, the term "PCIe specification" may refer to any revision and/or version of the PCI Express Base Specification published by the Peripheral Component Interconnect Special Interest Group (PCI-SIG), of Beaverton, Oregon. As a non-limiting example, the term PCIe specification may refer to "PCI Express Base Specification Revision 6.0, Version 1.0" published Jan. 11, 2022, without limitation.

A PCIe port may be made up of multiple lanes. According to the PCIe specification, the use of the lanes for communication with connected devices may be negotiated during the link-initialization process between PCIe Ports of connected devices.

Some PCIe ports are capable of bifurcation, i.e., the number of lanes on a specific port may be divided and allocated into separate links with separate devices. As a non-limiting example, a PCIe port of a PCIe switch may be connected to a PCIe port of a card including two separate devices. The lanes of the PCIe port of the switch may be respectively allocated for communication with each of the separate devices of the card, such that a first subset of the lanes of the PCIe port may be allocated to a first of the separate devices and a second subset of the lanes of the PCIe port may be allocated to a second of the separate devices.

BRIEF DESCRIPTION OF THE DRAWINGS

While this disclosure concludes with claims particularly pointing out and distinctly claiming specific examples, various features and advantages of examples within the scope of this disclosure may be more readily ascertained from the following description when read in conjunction with the accompanying drawings, in which:

DETAILED DESCRIPTION

Figure 1:
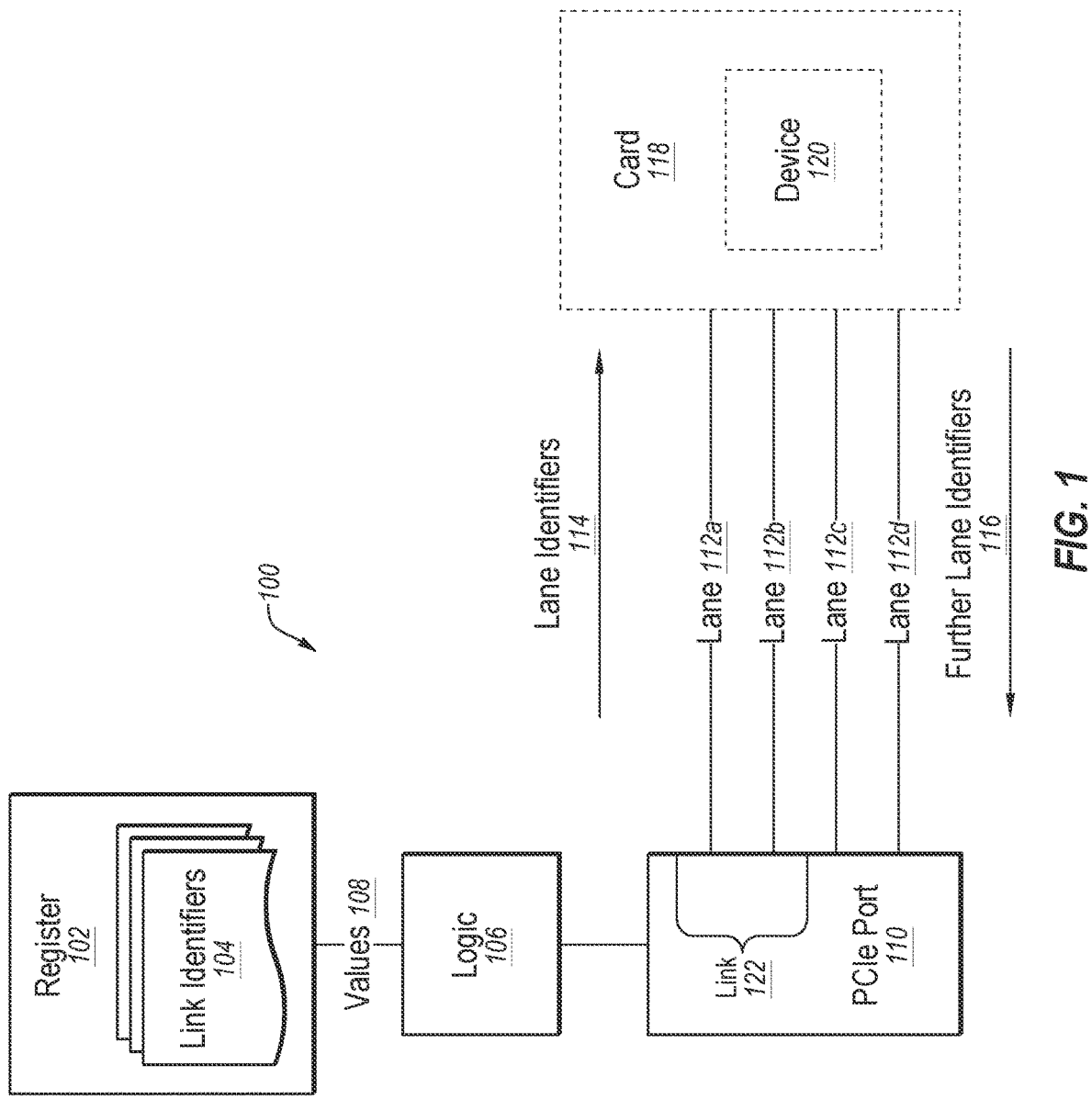
FIG. 1 is a functional block diagram illustrating an example apparatus according to one or more examples.

In the following detailed description, reference is made to the accompanying drawings, which form a part hereof, and in which are shown, by way of illustration, specific examples in which the present disclosure may be practiced. These examples are described in sufficient detail to enable a person of ordinary skill in the art to practice the present disclosure. However, other examples may be utilized, and structural, material, and process changes may be made without departing from the scope of the disclosure.

The illustrations presented herein are not meant to be actual views of any particular method, system, device, or structure, but are merely idealized representations that are employed to describe the examples of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

The following description may include examples to help enable one of ordinary skill in the art to practice the disclosed examples. The use of the terms "exemplary," "by example," and "for example," means that the related description is explanatory, and though the scope of the disclosure is intended to encompass the examples and legal equivalents, the use of such terms is not intended to limit the scope of an example of this disclosure to the specified components, steps, features, functions, or the like.

It will be readily understood that the components of the examples as generally described herein and illustrated in the drawing could be arranged and designed in a wide variety of different configurations. Thus, the following description of various examples is not intended to limit the scope of the present disclosure, but is merely representative of various examples. While the various aspects of the examples may be presented in drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be depicted by block diagram form in order not to obscure the present disclosure in unnecessary detail. Conversely, specific implementations shown and described are only examples and should not be construed as the only way to implement the present disclosure unless specified otherwise herein. Additionally, block definitions and partitioning of logic between various blocks is an example of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, and symbols that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal. A person having ordinary skill in the art would appreciate that this disclosure encompasses communication of quantum information and qubits used to represent quantum information.

The various illustrative logical blocks, modules, and circuits described in connection with the examples disclosed herein may be implemented or performed with a general purpose processor, a special purpose processor, a Digital Signal Processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer executes computing instructions (e.g., software code) related to examples of the present disclosure.

The examples may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, or a subprogram, without limitation. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

PCIe ports include multiple lanes. Some PCIe ports are capable of bifurcation, i.e., having lanes allocated to separate links, e.g., with separate devices. As a non-limiting example, a PCIe switch may have a PCIe port having sixteen lanes. The PCIe switch may allocate eight lanes of the PCIe port for a first link with a first device of a card connected to the PCIe port. The PCIe switch may further allocate four lanes of the PCIe port for a second link with a second device of the card and an additional four lanes of the PCIe port for a third link with a third device of the card.

Some examples of the present disclosure relate to methods, devices, and/or systems for determining allocation of lanes of a PCIe port for links. Further, some examples relate to methods, devices, and/or systems for allocating the lanes for the links. As a non-limiting example, a connection may be made between a PCIe port of a first device (e.g., a PCIe switch) and a PCIe port of a second device (e.g., a card having a PCIe port). The second device may include multiple component devices using the PCIe port (e.g., the card may include multiple devices (e.g., processors or memories, without limitation) communicatively coupled to the PCIe port). The first device may determine how to allocate lanes of its PCIe port for links with the multiple component devices of the second device.

Some examples of the present disclosure are according to the PCIe specification. Some examples of the present disclosure include modifications to default settings described by the PCIe specification. Some examples of the present disclosure operate in ways that are not defined by the PCIe specification. Some examples of the present disclosure include modifications that may not be according to the PCIe specification. Further, some examples of the present disclosure, may operate with the expectation that other devices may operate according to the PCIe specification.

FIG. 1 is a functional block diagram illustrating an example apparatus 100 according to one or more examples.

Apparatus 100 includes a register 102 to store link identifiers 104 for lanes 112*a*-112*d* of a peripheral component interconnect express (PCIe) port 110. Lane 112*a*, lane 112*b*, lane 112*c*, and lane 112*d* may be referred to collectively as "lanes 112" and/or individually as "lane 112." Apparatus 100 also includes logic 106 coupled to register 102 to set values 108 of link identifiers 104. Logic 106 may transmit, via respective lanes 112 of a number of lanes 112 of PCIe port 110, a respective lane identifier 114. Logic 106 may also receive, via the number of lanes 112 of PCIe port 110, respective further lane identifiers 116. Logic 106 may also determine which of the number of lanes 112 to allocate to a link 122 for communicating with a device 120 (e.g., of a card 118) coupled to PCIe port 110 at least partially responsive to the further lane identifiers 116. Value 108 may be at least partially responsive to the determined number of lanes 112 allocated to link 122.

Apparatus 100 may be any suitable device including PCIe port 110. As a non-limiting example, apparatus 100 may be a PCIe switch, e.g., including multiple PCIe ports. The PCIe switch may be capable of directing signals from one PCIe port to another PCIe port of the PCIe switch.

Register 102 may store values to be accessed by logic 106 and/or by other logic. As a non-limiting example, register 102 may store link identifiers 104 and/or values of link identifiers 104 which may be accessible (e.g., readable and/or writable) to logic 106.

Link identifiers 104 may be indicative of associations between links, such as link 122, and respective lanes 112. As a non-limiting example, link identifiers 104 may indicate that lane 112a and lane 112b are allocated to link 122. In some examples, link identifiers 104 may include a respective value 108 for respective ones of lanes 112 of PCIe port 110 (e.g., the values 108 corresponding to links). In other examples, link identifiers 104 may include a value 108 for respective links and an association between the links and lanes 112.

Logic 106 may be, or may include, any suitable circuitry for performing logic operations including, e.g., integrated circuits, without limitation.

Values 108 may be values read from and/or written to register 102. Values 108 may be values for link identifiers 104. As a non-limiting example, logic 106 may read values 108 of link identifiers 104 from register 102. Additionally or alternatively, logic 106 may write values 108 of link identifiers 104 to register 102.

PCIe port 110 may be a port for transmitting and/or receiving signals according to a PCIe specification. PCIe port 110 may be a downstream port of apparatus 100. PCIe port 110 may include multiple lanes 112. Lanes 112 may be respective physical channels for communication of respective signals. In FIG. 1, four lanes 112, lane 112a, lane 112b, lane 112c, and lane 112d are illustrated. Four lanes 112 are illustrated for descriptive purposes. In other examples, PCIe port 110 may include any number of lanes.

PCIe port 110 may be connected to a PCIe port (not illustrated) of card 118.

Card 118 is optional in FIG. 1 as indicated by card 118 being illustrated using dashed lines. Card 118 may include device 120 and one or more additional devices (not illustrated in FIG. 1). Device 120 is optional in FIG. 1 as indicated by device 120 being illustrated using dashed lines. As an example of contemplated operations, apparatus 100 may establish one or more links with devices (including device 120) of card 118. For example, apparatus 100 may negotiate a link number with card 118, with a PCIe port of card 118 (not illustrated in FIG. 1), or with devices of card 118. For example, logic 106 may transmit (or may cause PCIe port 110 to transmit) link numbers to card 118, with a respective link sent per lane 112, to the PCIe port of card 118, or to devices of card 118. Card 118, the PCIe port of card 118, or devices of card 118, may select a link number from the received link numbers and respond to apparatus 100 with the selected link number. The link number may be stored in apparatus 100 as a respective link identifier 104. Thereafter, communication with a particular device (including device 120) of card 118, may be according to the negotiated link and/or link number.

For example, logic 106 may transmit (or may cause PCIe port 110 to transmit) lane identifiers 114 at lanes 112. As a non-limiting example, logic 106 may transmit (or may cause PCIe port 110 to transmit) one respective lane identifier 114 at each lane 112. As a non-limiting example, logic 106 may transmit (or may cause PCIe port 110 to transmit) a signal (e.g., a packet) having fields according to a protocol (e.g., according to the PCIe specification). The packet may include a field for a "link." Logic 106 may transmit (or may cause PCIe port 110 to transmit) the packet using the "link" field to encode a respective one of lane identifiers 114. Additionally, the packet may include a field for a "lane." Logic 106 may transmit (or may cause PCIe port 110 to transmit) the packet with a null value, e.g., PAD characters in the "lane" field.

In some examples, lane identifiers 114 may have a respective value indicative of the lane 112 on which the lane identifier 114 is transmitted. As a non-limiting example, logic 106 may transmit (or may cause PCIe port 110 to transmit) a lane identifier 114 having a value of "0" on lane 112a (e.g., a first lane of PCIe port 110), a lane identifier 114 having a value of "1" on lane 112b (e.g., a second lane of PCIe port 110), a lane identifier 114 having a value of "2" on lane 112c (e.g., a third lane of PCIe port 110), and a lane identifier 114 having a value of "3" on lane 112d (e.g., a fourth lane of PCIe port 110).

In other examples, the lane identifier 114 may have a value related to a capability of PCIe port 110 to allocate lanes to links. For example, in a case where PCIe port 110 is capable of forming links having two lanes (e.g., at the fewest), PCIe port 110 may transmit lane identifiers 114 having the same values on two lanes (e.g., adjacent lanes). As a non-limiting example, logic 106 may transmit (or may cause PCIe port 110 to transmit) a lane identifier 114 having a value of "0" on lane 112a, a lane identifier 114 having a value of "0" on lane 112b, a lane identifier 114 having a value of "1" on lane 112c, and a lane identifier 114 having a value of "1" on lane 112d. Additional detail regarding transmitting lane identifiers 114 is illustrated and described with regard to FIG. 3.

Device 120 may receive one or more lane identifiers 114 transmitted at lanes 112. As noted earlier, the lane identifiers 114 may be encoded in the "link" field of a packet. According to the PCIe specification, device 120 may respond by transmitting further lane identifiers 116. According to the PCIe specification, device 120 may transmit the further lane identifiers 116 in a "link" field of a packet. The packet may additionally include null values (e.g., PADs) in the "lane" field. According to the PCIe specification, device 120 may transmit a further lane identifier 116 on all lanes which device 120 will use to communicate (e.g., according to a layout or configuration of card 118). As a non-limiting example, device 120 may transmit one further lane identifier 116 on lane 112a and another further lane identifier 116 on lane 112b based on device 120 being wired to use lane 112a and lane 112b to communicate (e.g., with or through apparatus 100). Additionally, though not illustrated in FIG. 1, card 118 may include additional devices that may receive lane identifiers 114 on lanes 112 (e.g., on lane 112c and lane 112d) and may transmit additional further lane identifiers 116 on lanes 112.

According to the PCIe specification, device 120 may transmit the same further lane identifier 116 (or further lane identifiers 116 having the same value) on all lanes 112 that it intends to use to communicate. Further, according to the PCIe specification, device 120 may transmit further lane identifiers 116 having the same value as one of the lane identifier 114 which it received. As a non-limiting example, if device 120 receives a lane identifier 114 having a value of "0" on lane 112a, device 120 may transmit a further lane identifier 116 having a value of "0" on lane 112a and a further lane identifier 116 having a value of "0" lane 112b. Further, according to the PCIe specification, device 120 may transmit further lane identifiers 116 having the same value as the lane identifier 114 received on the "first" interface of device 120. Additionally or alternatively, according to the PCIe specification, device 120 may transmit further lane identifiers 116 having the same value as a lowest-numbered value of lane identifiers 114 which device 120 has received. Additional detail regarding transmitting further lane identifiers 116 is illustrated and described with regard to FIG. 3.

Logic 106 may receive further lane identifiers 116 and may determine to allocate lanes 112 to links (including link 122) at least partially responsive to further lane identifiers 116. As a non-limiting example, logic 106 may determine to allocate lanes 112 according to which lanes 112 received the same further lane identifier 116 (or according to which lanes 112 received further lane identifiers 116 having the same value). As a non-limiting example, logic 106 may allocate lane 112a and lane 112b to link 122 responsive to the further lane identifier 116 received at lane 112a having a value of "0" and based on the further lane identifier 116 received at lane 112b having the value of "0."

Logic 106 may allocate lanes 112 to respective links 122. For example, logic 106 may set values 108 of link identifiers 104 stored at register 102 to indicate which of lanes 112 are allocated various links. For example, logic 106 may provide values 108 to register 102 indicative that lane 112a and lane 112b are to be allocated to link 122. For example, logic 106 may provide a value 108 of "0" for a link identifier 104 of lane 112a and a value 108 of "0" for a link identifier 104 of lane 112b.

In some cases, PCIe port 110 may be reset and the links may be established according to the link identifiers 104 stored at register 102.

In some cases, following the negotiation of links, apparatus 100, logic 106, or PCIe port 110 may determine identifiers for lanes (from among the lanes allocated to the links) with the devices. For example, after logic 106 has allocated lane 112a and lane 112b to link 122 to communicate with device 120, apparatus 100, logic 106, or PCIe port 110 may cooperate with device 120 to identify lane numbers of lane 112a and lane 112b with regard to link 122. For example, logic 106 may cause a packet including values in "lane" fields to be sent to device 120. Device 120 may reply with a packet including values in the "lane" fields.

Further, in some examples, logic 106 may manage PCIe port 110 such that signals (e.g., packets) for certain interfaces of certain devices of card 118 are transmitted at corresponding lanes 112 according to the determined allocation of lanes 112 to the links 122 corresponding to the certain devices. Also, logic 106 may manage PCIe port 110 such that signals (e.g., packets) received at certain lanes 112 are routed from apparatus 100 (e.g., at another PCIe port (not illustrated in FIG. 1)) to other devices (not illustrated in FIG. 1) according to the determined allocation of lanes 112 to links 122 (e.g., including source addresses corresponding to the devices of card 118 from which the signals originated).

Figure 2:
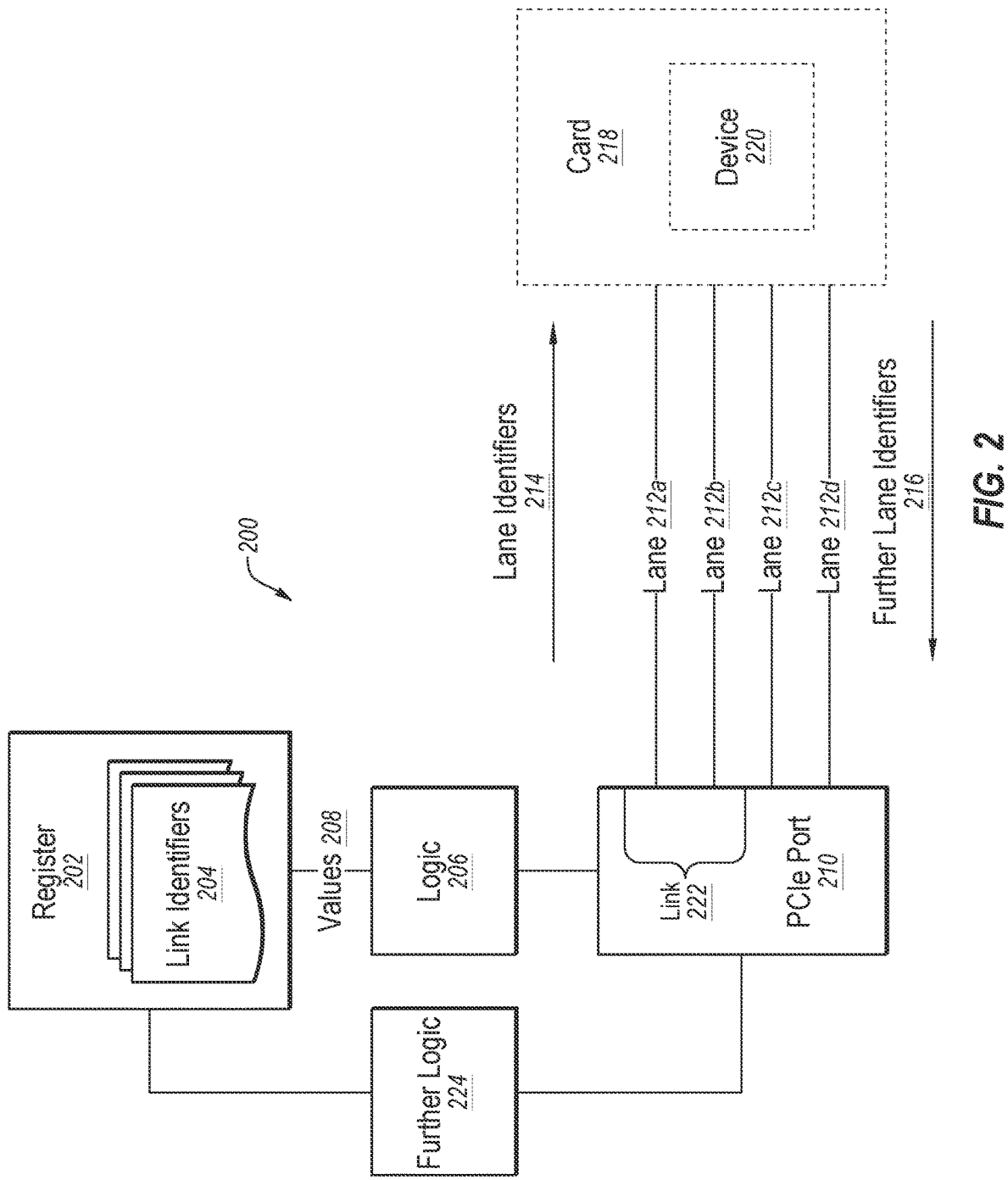
FIG. 2 is a functional block diagram illustrating an example apparatus according to one or more examples.

FIG. 2 is a functional block diagram illustrating another example apparatus 200 according to one or more examples.

Apparatus 200 includes a register 202 to store link identifier 204 for lanes 212 of a peripheral component interconnect express (PCIe) port 210. Lane 212a, lane 212b, lane 212c, and lane 212d may be referred to collectively as "lanes 212" and/or individually as "lane 212." Apparatus 200 also includes logic 206 coupled to register 202 to set values 208 of link identifiers 204. Logic 206 may transmit, via respective lanes 212 of PCIe port 210, respective lane identifiers 214. Logic 206 may also receive, via lanes 212 of PCIe port 210, further lane identifiers 216. Logic 206 may also determine which of the number of lanes 212 to allocate to a link 222 for communicating with a device 220 (e.g., of a card 218) coupled to PCIe port 210 at least partially responsive to the further lane identifiers 216. Logic 206 may also set value 208 of a respective link identifier 204 stored at register 202. The value 208 may be at least partially responsive to the determined number of lanes 212 allocated to link 222.

Apparatus 200 may also include further logic 224 coupled to register 202 to read values 208 of link identifiers 204. Further logic 224 may read value 208 of the respective link identifier 204 stored at register 202. Further logic 224 may also allocate the determined lanes 212 of the number of lanes 212 to link 222 at least partially responsive to the respective link identifier 204.

Register 202 may be the same as, substantially similar to, function the same as, and/or function substantially similarly to register 102 of FIG. 1. Link identifier 204 may be the same as, substantially similar to, function the same as, and/or function substantially similarly to link identifier 104 of FIG. 1. Logic 206 may be the same as, substantially similar to, function the same as, and/or function substantially similarly to logic 106 of FIG. 1. Value 208 may be the same as, substantially similar to, function the same as, and/or function substantially similarly to value 108 of FIG. 1. PCIe port 210 may be the same as, substantially similar to, function the same as, and/or function substantially similarly to PCIe port 110 of FIG. 1. Lanes 212 may be the same as, substantially similar to, function the same as, and/or function substantially similarly to lanes 112 of FIG. 1. Lane identifiers 214 may be the same as, substantially similar to, function the same as, and/or function substantially similarly to lane identifiers 114 of FIG. 1. Further lane identifiers 216 may be the same as, substantially similar to, function the same as, and/or function substantially similarly to further lane identifiers 116 of FIG. 1. Card 218 may be the same as, substantially similar to, function the same as, and/or function substantially similarly to card 118 of FIG. 1. Device 220 may be the same as, substantially similar to, function the same as, and/or function substantially similarly to device 120 of FIG. 1. Link 222 may be the same as, substantially similar to, function the same as, and/or function substantially similarly to link 122 of FIG. 1.

Apparatus 200 may be substantially similar to and/or function substantially similarly to apparatus 100 of FIG. 1. A difference between apparatus 200 and apparatus 100 is that apparatus 200 includes further logic 224. Further logic 224 may be, or may include, any suitable circuitry for performing logic operations including, e.g., integrated circuits, without limitation.

As described with regard to logic 106 and FIG. 1, logic 206 may determine an allocation for lanes. In apparatus 200, further logic 224 may implement the determined allocation of lanes. For example, further logic 224 may, among other things, allocate lanes 212 to links 222. For example, logic 206 may determine allocation of lanes 212 to links 222 and may store link identifiers 204 indicative of the determined allocations. Further logic 224 may read values 208 of link identifiers 204 and reset PCIe port 210 to reinitialize state machines of PCIe port 210 according to the allocation of lanes 212 to links 222.

Figure 3:
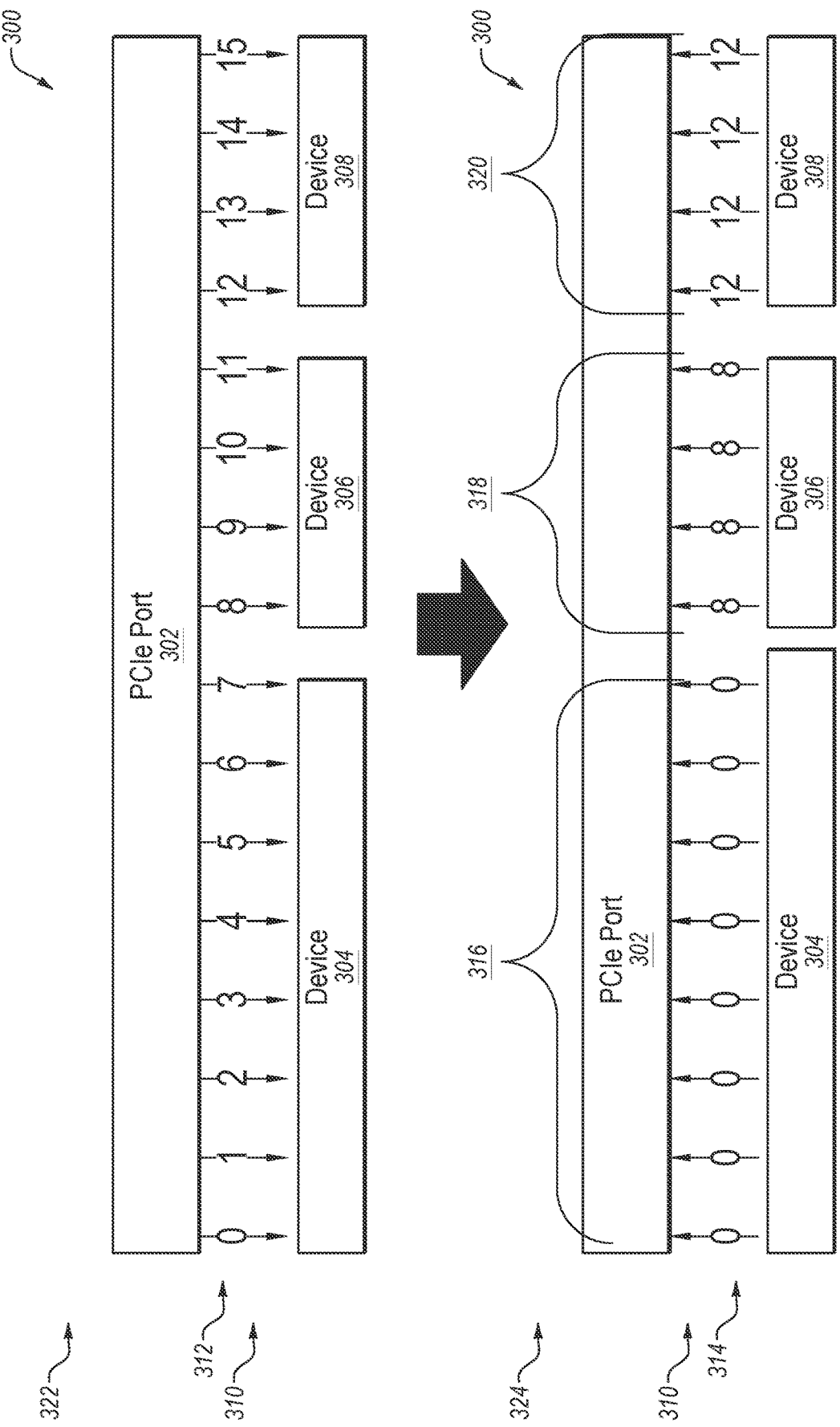
FIG. 3 illustrates an aspect of the subject matter in accordance with one embodiment.

FIG. 3 is a functional block diagram illustrating an example system 300 at a first time 322 and a second time 324 according to one or more examples.

System 300 includes PCIe port 302, device 304, device 306, and device 308. PCIe port 302 includes sixteen lanes 310. PCIe port 302 may transmit lane identifiers 312 at first time 322. Device 304, device 306, and device 308, coupled to respective ones of lanes 310, may transmit further lane identifiers 314 at second time 324, where second time 324 is subsequent to first time 322. Lanes 310 of PCIe port 302 may be allocated to links responsive to further lane identifiers 314. As a non-limiting example, through operations described herein, eight lanes 316 may be allocated to a first link between PCIe port 302 and device 304, four lanes 318 may be allocated to a second link between PCIe port 302 and device 306, and four lanes 320 may be allocated to a third link between PCIe port 302 and device 308. In FIG. 3, sixteen lanes 310 are illustrated for descriptive purposes. In other examples, PCIe port 302 may have any number of lanes.

PCIe port 302 may be an example of PCIe port 110 of FIG. 1 or of PCIe port 210 of FIG. 2. Each of device 304, device 306, and device 308 may be an example of device 120 of FIG. 1 or device 220 of FIG. 2. Lanes 310 may be an example of lanes 112 of FIG. 1 or lanes 212 of FIG. 2. Lane identifiers 312 may be examples of lane identifiers 114 of FIG. 1 or lane identifiers 214 of FIG. 2. Further lane identifiers 314 may be examples of further lane identifiers 116 of FIG. 1 or further lane identifiers 216 of FIG. 2.

As an example of operations of examples of the present disclosure, at first time 322, PCIe port 302 may transmit lane identifiers 312 at lanes 310. In some examples, respective ones of lane identifiers 312 may correspond to respective lanes on which they was transmitted. As a non-limiting example, a lane identifier transmitted on a first lane of PCIe port 302 may include a value of "0," a lane identifier transmitted on a second lane of PCIe port 302 may include a value of "1," and so forth. As described above with regard to lane identifiers 114 of FIG. 1, and as a non-limiting example, lane identifiers 312 may be transmitted in "link" fields of packets, without limitation. In other examples (not illustrated in FIG. 3), the lane identifier 312 may have a value related to a capability of PCIe port 302 to split lanes between links. For example, in a case where PCIe port 302 is capable of forming links having two lanes (e.g., at the fewest), PCIe port 302 may transmit lane identifiers 312 having the same values on two lanes (e.g., adjacent lanes), which same values may be used by PCIe port 302 to allocate the lanes to links. As a non-limiting example, PCIe port 302 may transmit a lane identifier 312 having a value of "0" on both a first lane 310 and a second lane 310 of PCIe port 302 and a lane identifier 312 having a value of "1" on both a third lane 310 and a fourth lane 310 of PCIe port 302.

Continuing the example of operations, at (or by) second time 324, each of device 304, device 306, and device 308 may have transmitted further lane identifiers 314 according to the PCIe specification. As described above with regard to further lane identifiers 116 of FIG. 1, and as a non-limiting example, further lane identifiers 314 may be transmitted in "link" fields of packets, without limitation. As a non-limiting example, according to the PCIe specification, device 304, including eight lanes 316 communicatively coupled to PCIe port 302, may transmit eight further lane identifiers 314, e.g., one on each of lanes 316. Further, according to the PCIe specification, device 306, including four lanes 318 communicatively coupled to PCIe port 302, may transmit four further lane identifiers 314, e.g., one on each of lanes 318. Further, according to the PCIe specification, device 308, including four lanes 320 communicatively coupled to PCIe port 302, may transmit four further lane identifiers 314, e.g., one on each of lanes 320.

According to the PCIe specification, each of device 304, device 306, and device 308 may transmit a same respective further lane identifier 314 (or further lane identifiers 314 having a same respective value) at all of their respective lanes. As a non-limiting example, according to the PCIe specification, device 304 may transmit further lane identifiers 314 having a same value (e.g., "0") at each of lanes 316. Further, according to the PCIe specification, device 306 may transmit further lane identifiers 314 having a same value (e.g., "8") at each of lanes 318. Further, according to the PCIe specification, device 308 may transmit further lane identifiers 314 having a same value (e.g., "12") at each of lanes 320.

Further, according to the PCIe specification, each of device 304, device 306, and device 308 may transmit a respective further lane identifier 314 that is the same as one of the lane identifiers 312 that it received (or further lane identifiers 314 having a same respective value as one of the lane identifiers 312 that it received). As a non-limiting example, according to the PCIe specification, device 304 may transmit further lane identifiers 314 having a value of "0" because device 304 received, as one of the lane identifiers 312 that it received, a lane identifier 312 having a value of "0." Further, according to the PCIe specification, device 306 may transmit further lane identifiers 314 having value of "8" because device 306 received, as one of the lane identifiers 312 that it received, a lane identifier 312 having a value of "8." Further, according to the PCIe specification, device 308 may transmit further lane identifiers 314 having a value of "12" because device 308 received, as one of the lane identifiers 312 that it received, a lane identifier 312 having a value of "12."

Further, according to the PCIe specification, each of device 304, device 306, and device 308 may transmit respective further lane identifiers 314 that are the same as (or that have the same value as) a lane identifier 312 received at a first interface of the respective device. As a non-limiting example, a leftmost (from the perspective of FIG. 3) of lanes 316 may be communicatively coupled to a first interface of device 306. Based on device 304 receiving a lane identifier 312 having a value of "0" at the first interface, device 304 may transmit further lane identifiers 314 all having a value of "0" on all of lanes 316. Similarly, device 306 may receive a lane identifier 312 having a value of "8" at its first interface and therefore may transmit further lane identifiers 314 all having a value of "8" on all of lanes 318. Similarly, device 308 may receive a lane identifier 312 having a value of "12" at its first interface and therefore may transmit further lane identifiers 314 all having a value of "12" on all of lanes 320.

Additionally or alternatively, each of device 304, device 306, and device 308 may transmit respective further lane identifiers 314 that are the same as (or that have the same value as) a lowest-numbered lane of lane identifiers 312 received by the respective device. As a non-limiting example, device 304, having received a lane identifier 312 having a value of "0" and no lower-numbered lane identifiers, may transmit further lane identifiers 314 all having a value of "0" on all of lanes 316. Similarly, device 306 may receive a lane identifier 312 having a value of "8" and no lower-valued lane identifiers. Device 306 may therefore may transmit further lane identifiers 314 all having a value of "8" on all of lanes 318. Similarly, device 308 may receive a lane identifier 312 having a value of "12" and no lower-valued lane identifiers. Device 308 may therefore may transmit further lane identifiers 314 all having a value of "12" on all of lanes 320.

An allocation of lanes 310 may be determined responsive to further lane identifiers 314. As a non-limiting example, each lane on which a same further lane identifier 314 was received by PCIe port 302 may be allocated to a same link. As a non-limiting example, lanes 316, on all of which further lane identifiers 314 having a value of "0" were received, may be allocated to a first link for communication with device 304. Similarly, lanes 318, on all of which further lane identifiers 314 having a value of "8" were received, may be allocated to a second link for communication with device 306. Similarly, lanes 320, on all of which further lane identifiers 314 having a value of "12" were received, may be allocated to a third link for communication with device 308.

In some examples, following the determined allocation of lanes 310 to links with devices, PCIe port 302 may be reset.

In some examples following the determination of allocation of lanes 310 to links, lane number among the lanes allocated to links may be determined. For example, PCIe port 302 may send a packet including values in the "lane" field to each of device 304, device 306, and device 308. Each of device 304, device 306, and device 308 may reply with a packet including values in the "lane" field.

Figure 4:
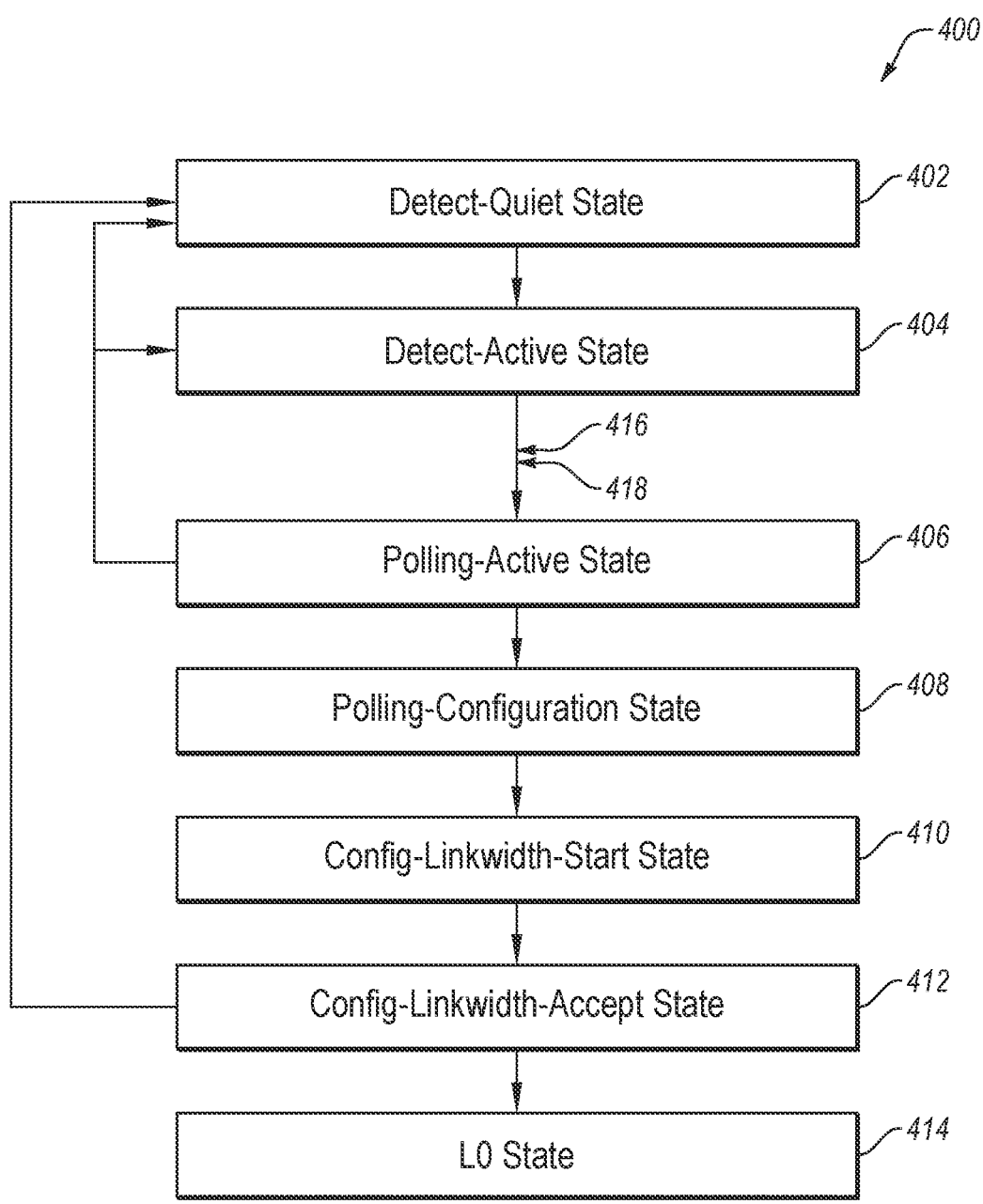
FIG. 4 illustrates an aspect of the subject matter in accordance with one embodiment.

FIG. 4 is a state diagram 400 illustrating states of a PCIe-port-configuration process and PCIe-port-configuration-state transitions according to one or more examples.

Some of the states of the PCIe-port-configuration process and the PCIe-port-configuration-state transitions of state diagram 400 are according to the PCIe specification. As a non-limiting example, state diagram 400 includes a detect-quiet state 402, which detect-quiet state 402 is followed by a detect-active state 404, which detect-active state 404 is followed by a polling-active state 406, which polling-active state 406 is followed by a polling-configuration state 408, which polling-configuration state 408 is followed by a config-linkwidth-start state 410, which config-linkwidth-start state 410 is followed by a config-linkwidth-accept state 412. Config-linkwidth-accept state 412 may be followed by a L0 state 414, if config-linkwidth-accept state 412 completes successfully. Alternatively, config-linkwidth-accept state 412 may be followed by a return to detect-quiet state 402 if config-linkwidth-accept state 412 does not complete successfully. L0 state 414 may be a "link up" state in which devices may communicate using the link.

A difference between state diagram 400 illustrating examples of the present disclosure and the default settings described by PCIe specification is that time period 416 is between detect-active state 404 (and/or detect-quiet state 402) and polling-active state 406. Time period 416 may be a delay between detect-active state 404 and polling-active state 406 to receive further respective lane identifiers on each of the number of lanes before allowing the state transition. As a non-limiting example, in the absence of time period 416, the PCIe-port-configuration process may proceed from detect-active state 404 to polling-active state 406 after a first response is received from a first device. As a non-limiting example, in a case where a PCIe port is connected to a PCIe port of a single device, transitioning from detect-active state 404 to polling-active state 406 after a single response is received from the single device (according to the default settings described in the PCIe specification) may allow for efficient establishment a link. However, in cases where lanes of the PCIe port are being potentially allocated to multiple devices, delaying the transition from detect-active state 404 to polling-active state 406 to wait for additional devices (i.e., devices responding after a first device) to respond before proceeding from detect-active state 404 to polling-active state 406 may allow for the establishment of multiple links.

Including time period 416 between detect-active state 404 (and/or detect-quiet state 402) and polling-active state 406 may cause the PCIe-port-configuration process to be delayed so that there is sufficient time for all devices connected to the PCIe port running the PCIe-port-configuration process to respond before the PCIe-port-configuration process moves to polling-active state 406. Time period 416 may be between 1 millisecond and 4 milliseconds 418. In some examples, time period 416 may be 2 milliseconds.

Figure 5:
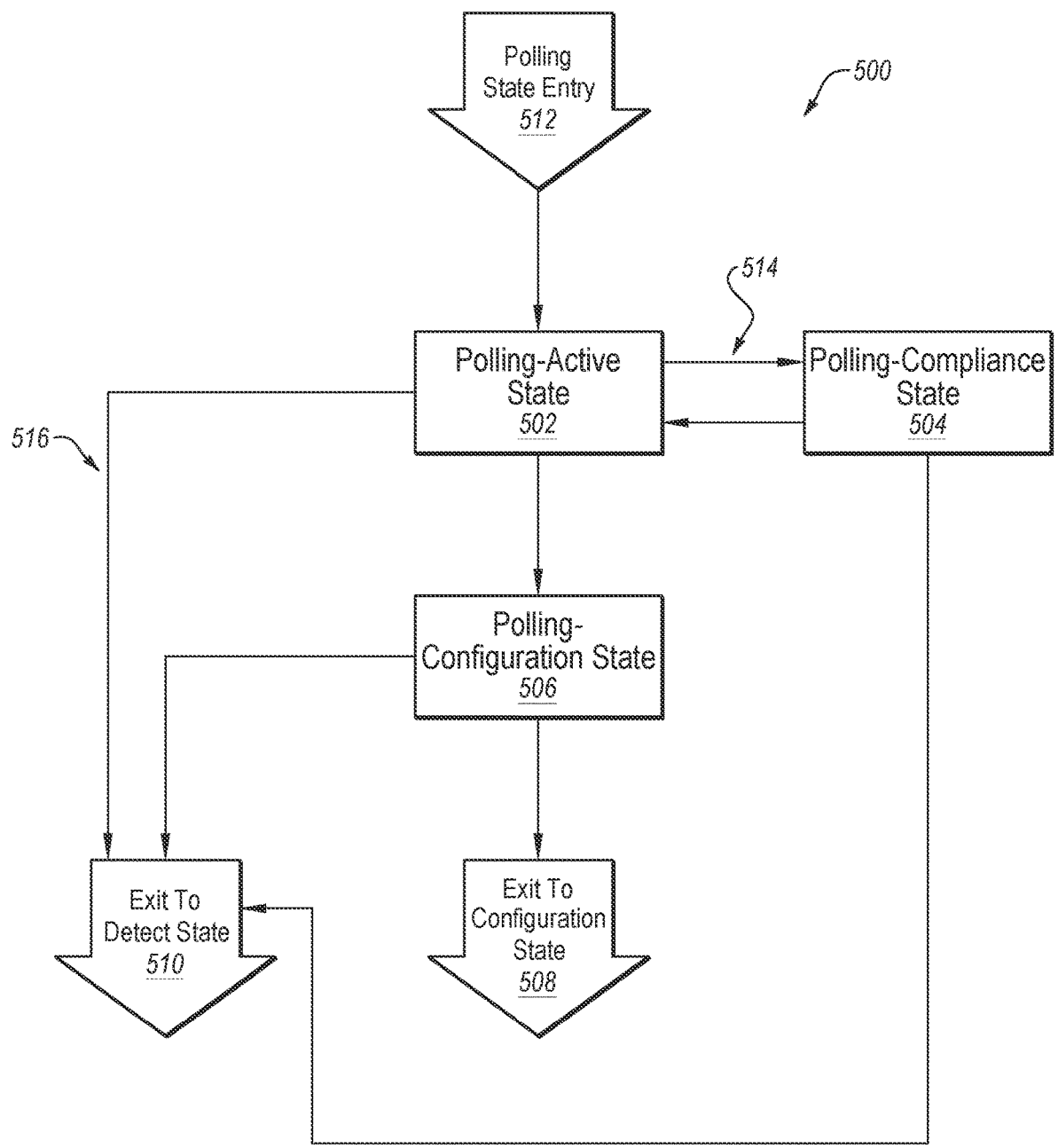
FIG. 5 illustrates an aspect of the subject matter in accordance with one embodiment.

FIG. 5 is a state diagram 500 illustrating states of a PCIe-port-configuration process and PCIe-port-configuration-state transitions according to one or more examples.

Some of the states of the PCIe-port-configuration process and the PCIe-port-configuration-state transitions of state diagram 500 are according to the PCIe specification. As a non-limiting example, state diagram 500 includes polling state entry 512 which is followed by polling-active state 502. Polling-active state 502 may be followed by polling-configuration state 506 if polling-active state 502 competes successfully. Alternatively, according to the PCIe specification, polling-active state 502 may be followed by polling-compliance state 504 if polling-active state 502 does not complete successfully. Polling-configuration state 506 may be followed by exit to configuration state 508 if polling-configuration state 506 completes successfully. Alternatively, polling-configuration state 506 may be followed by exit to detect state 510 if polling-configuration state 506 does not complete successfully.

One or more states of state diagram 500 may be examples of, substrates of, entries to, or exits from states of state diagram 400 of FIG. 4. As a non-limiting example, polling state entry 512 may follow detect-active state 404 of FIG. 4 (e.g., after time period 416 of FIG. 4). Polling-active state 502 may be an example of polling-active state 406 of FIG. 4 and polling-configuration state 506 may be an example of polling-configuration state 408 of FIG. 4. Polling-compliance state 504 may be a substrate of polling-active state 502, polling-configuration state 506, polling-active state 406, and/or polling-configuration state 408. Exit to configuration state 508 may be followed by config-linkwidth-start state 410 of FIG. 4. Exit to detect state 510 may be followed by detect-quiet state 402 or detect-active state 404 of FIG. 4.

A difference between state diagram 500 illustrating examples of the present disclosure and the default settings described by PCIe specification is that in state diagram 500 a transition 514 from polling-active state 502 to polling-compliance state 504 may be disabled. In other words, in state diagram 500, according to one or more examples, PCIe-port-configuration-state transitions may exclude or prevent transition 514 from polling-active state 502 to polling-compliance state 504. In case of conditions under which a PCIe-port-configuration process according to the PCIe specification would transition from polling-active state 502 to polling-compliance state 504, examples of the present disclosure may instead exit to detect state 510.

For example, state diagram 500 includes a transition 516 from polling-active state 502 to exit to detect state 510. In state diagram 500, according to one or more examples of the present disclosure, PCIe-port-configuration-state transitions may transition from polling-active state 502 to exit to detect state 510 under certain conditions. In some examples, the certain conditions include the conditions under which a PCIe-port-configuration process according to the PCIe specification would transition from polling-active state 502 to polling-compliance state 504. In other words, transition 516 may replace transition 514. Stated in other words, if polling-active state 502 does not successfully complete, the PCIe-port-configuration process of state diagram 500 may transition from polling-active state 502 to exit to detect state 510 instead of transitioning to polling-compliance state 504.

In a PCIe-port-configuration process according to the PCIe specification, a PCIe-port-configuration process may transition from polling-active state 502 to polling-compliance state 504 in response to certain conditions. In polling-compliance state 504, the PCIe-port-configuration process may test a link of the PCIe port, e.g., testing transmission and reception, e.g., for compliance with the PCIe specification. Thereafter the PCIe-port-configuration process may return from polling-compliance state 504 to polling-active state 502. In a case where a PCIe port is connected to a PCIe port of a single device, transitioning from polling-active state 502 to polling-compliance state 504 may allow the PCIe port to test the link then return to normal operation. However, in cases where lanes of the PCIe port are being potentially allocated to multiple devices, transitioning from polling-active state 502 to polling-compliance state 504 may be undesirable. For example, the certain conditions that trigger a transition from the polling-active state 502 to the polling-compliance state 504 may not be not be a problem for a PCIe port including lanes allocated for multiple links. Therefore, the certain conditions may not merit further testing of the PCIe port. Accordingly, suppressing transition 514, or replacing transition 514 with transition 516 may improve operations of a PCIe port including lanes allocated to more than one link.

Figure 6:
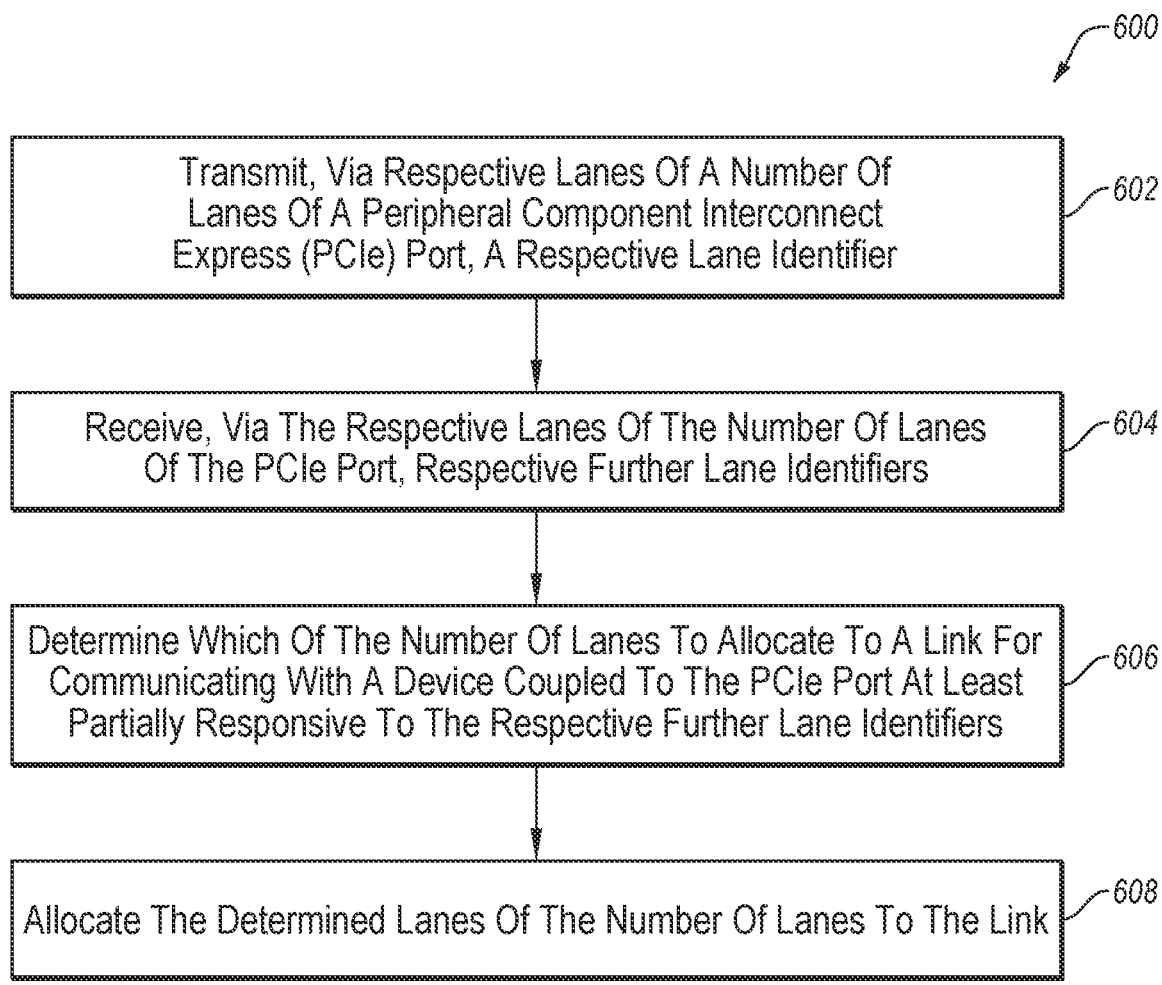
FIG. 6 illustrates a method in accordance with one embodiment.

FIG. 6 is a flowchart of an example method 600, in accordance with various examples of the disclosure. At least a portion of method 600 may be performed, in some examples, by a device or system, such as apparatus 100 of FIG. 1, logic 106, of FIG. 1, apparatus 200 of FIG. 2, logic 206, of FIG. 2, further logic 224 of FIG. 2, device 1000 of FIG. 10 or another device or system. Although illustrated as discrete blocks, various blocks may be divided into additional blocks, combined into fewer blocks, or eliminated, depending on the desired implementation.

At operation 602, a respective lane identifier may be transmitted via respective lanes of a number of lanes of a peripheral component interconnect express (PCIe) port. Any of lane identifiers 114 of FIG. 1, lane identifiers 214 of FIG. 2, and lane identifiers 312 of FIG. 3 may be examples of the lane identifiers of method 600. Any of lanes 112 of FIG. 1, lanes 212 of FIG. 2, and lanes 310 of FIG. 3 may be examples of the lanes of method 600. Any of PCIe port 110 of FIG. 1, PCIe port 210 of FIG. 2, and PCIe port 302 of FIG. 3 may be examples of the PCIe port of method 600.

At operation 604, respective further lane identifiers may be received, via respective lanes of the number of lanes of the PCIe port. Any of further lane identifiers 116 of FIG. 1, further lane identifiers 216 of FIG. 2, and further lane identifiers 314 of FIG. 3 may be examples of the respective further lane identifiers of method 600.

At operation 606, which of the number of lanes to allocate to a respective link for communicating with a device coupled to the PCIe port may be determined. The determination may be at least partially responsive to the respective further lane identifiers. Any of link 122 of FIG. 1 and link 222 of FIG. 2 may be an example of the link of method 600. Any of device 120 of FIG. 1, device 220 of FIG. 2, device 304 of FIG. 3, device 306 of FIG. 3, and device 308 of FIG. 3 may be examples of devices of method 600.

In operation 608, the determined lanes of the number of lanes are allocated to the link. As a non-limiting example, logic may set values of link identifiers stored at a register. The values may be responsive to the number of lanes determined to be allocated to the link with the device. Further, in some examples, logic may manage the PCIe port such that signals (e.g., packets) for certain interfaces of certain devices are transmitted at corresponding lanes according to the determined allocation of lanes. Also, logic may manage the PCIe port such that signals (e.g., packets) received at certain lanes are routed according to the determined allocation of lanes.

Figure 7:
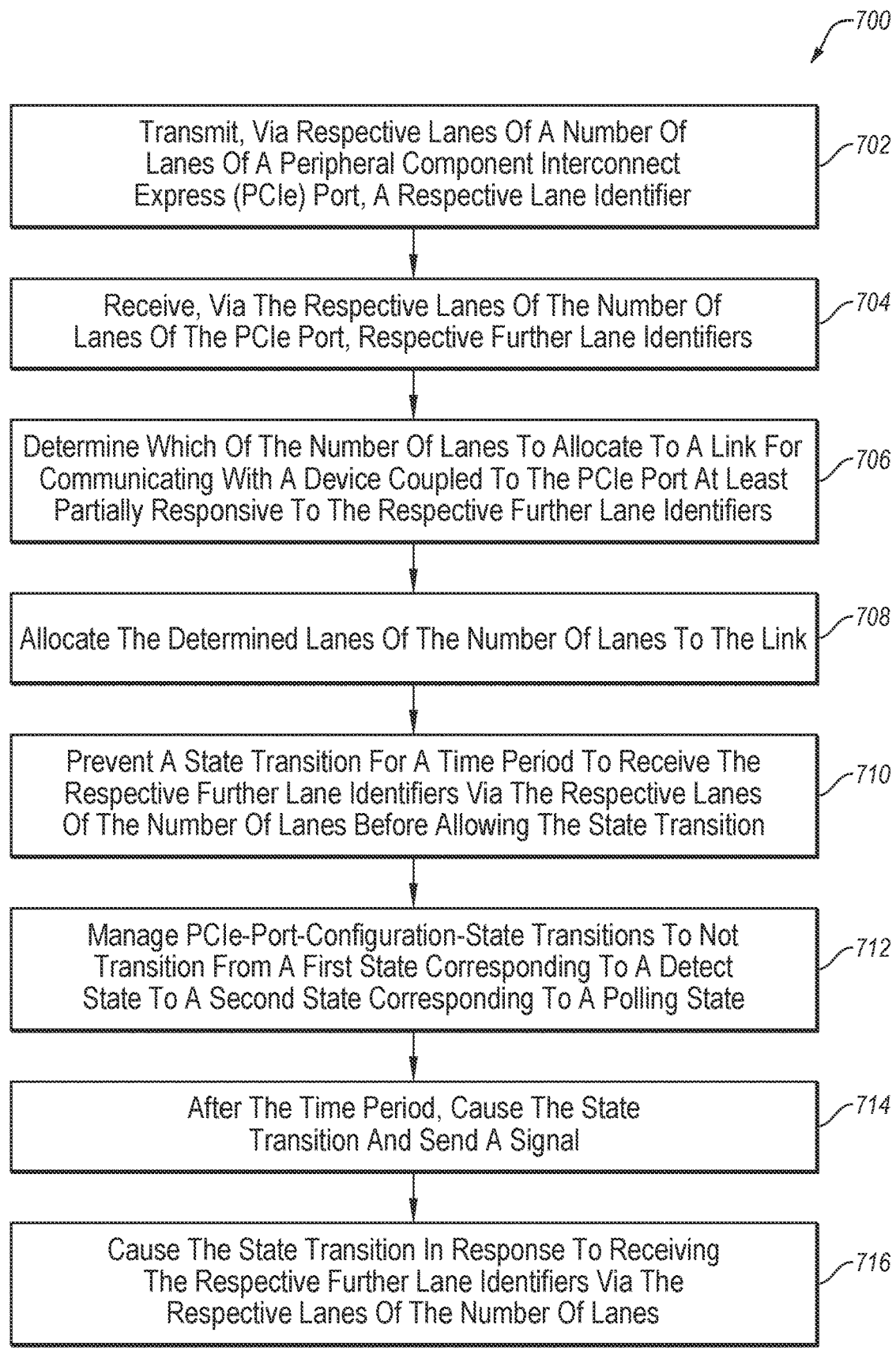
FIG. 7 illustrates an aspect of the subject matter in accordance with one embodiment.

FIG. 7 is a flowchart of an example method 700, in accordance with various examples of the disclosure. At least a portion of method 700 may be performed, in some examples, by a device or system, such as apparatus 100 of FIG. 1, logic 106, of FIG. 1, apparatus 200 of FIG. 2, logic 206, of FIG. 2, further logic 224 of FIG. 2, device 1000 of FIG. 10 or another device or system. Although illustrated as discrete blocks, various blocks may be divided into additional blocks, combined into fewer blocks, or eliminated, depending on the desired implementation.

Operation 702 may be the same as operation 602 of FIG. 6. Operation 704 may be the same as operation 604 of FIG. 6. Operation 706 may be the same as operation 606 of FIG. 6. Operation 708 may be the same as operation 608 of FIG. 6.

At operation 710, a state transition may be prevented for a time period to receive the respective further lane identifiers via respective lanes of the number of lanes before allowing the state transition. As a non-limiting example, a transition from detect-active state 404 of FIG. 4 to polling-active state 406 of FIG. 4 may be prevented for time period 416 of FIG. 4.

Operations 712-716 may be alternatives to operation 710. At operation 712, PCIe-port-configuration-state transitions may be managed to not transition from a first state corresponding to a detect state to a second state corresponding to a polling state. As a non-limiting example, a transition from detect-active state 404 of FIG. 4 to polling-active state 406 of FIG. 4 may be prevented for time period 416 of FIG. 4.

At operation 714, after the time period, the state transition may be caused and a signal may be sent. As a non-limiting example, after time period 416, the transition from detect-active state 404 to polling-active state 406 may be caused. Further, a signal may be sent, e.g., an interrupt signal may be sent. The signal may be received by further logic. As a non-limiting example, logic 206 of FIG. 2 may send a signal of operation 714 and further logic 224 of FIG. 2 may receive the signal and may respond to the signal. The signal may be indicative that the linkup process has begun.

At operation 716, the state transition may be caused responsive to receiving the respective further lane identifiers via the respective lanes of the number of lanes. As a non-limiting example, if further lane identifiers 314 of FIG. 3 are received at each of lanes 310 of FIG. 3, the state transition may be caused.

Figure 8:
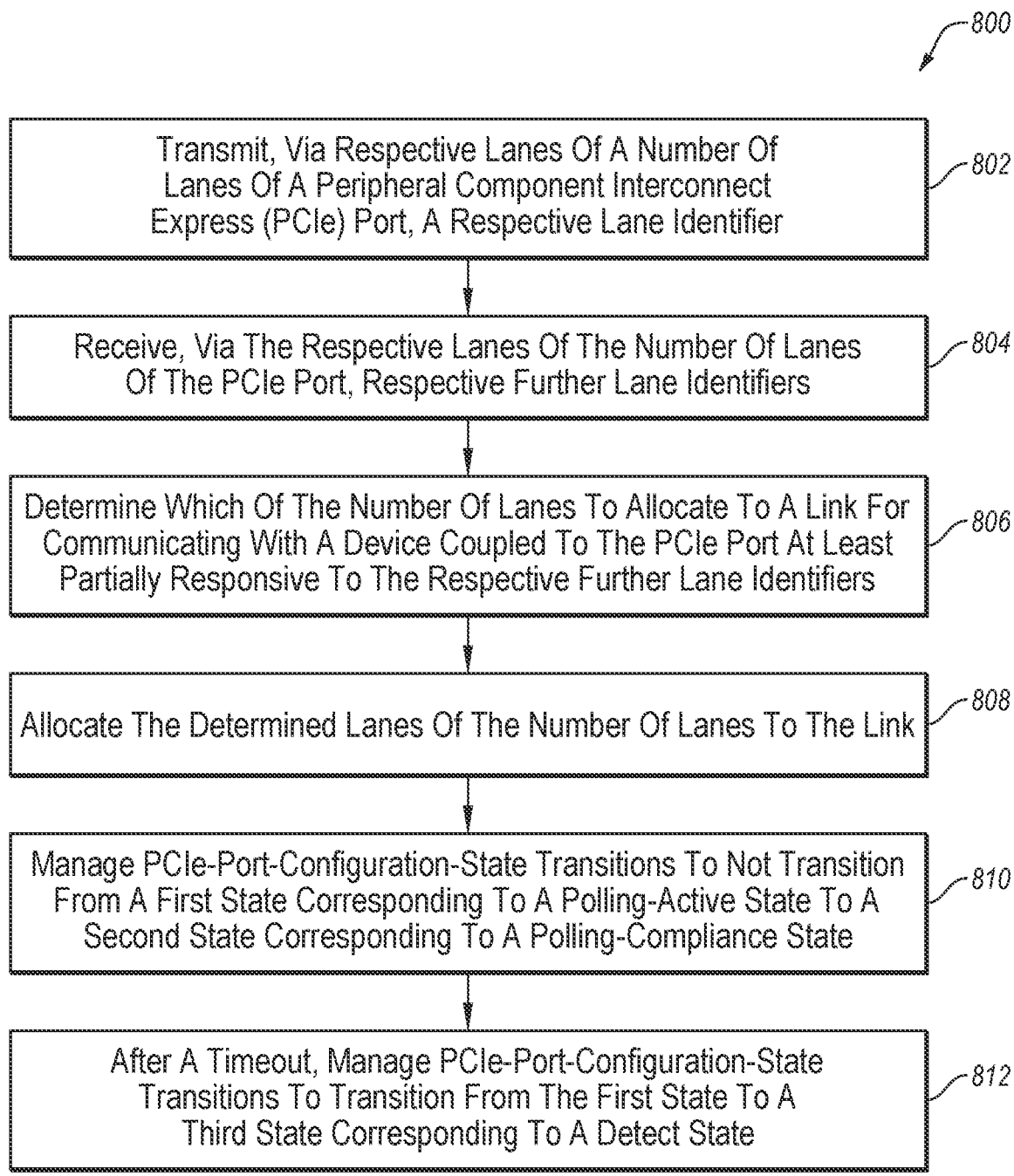
FIG. 8 illustrates an aspect of the subject matter in accordance with one embodiment.

FIG. 8 is a flowchart of an example method 800, in accordance with various examples of the disclosure. At least a portion of method 800 may be performed, in some examples, by a device or system, such as apparatus 100 of FIG. 1, logic 106, of FIG. 1, apparatus 200 of FIG. 2, logic 206, of FIG. 2, further logic 224 of FIG. 2, device 1000 of FIG. 10 or another device or system. Although illustrated as discrete blocks, various blocks may be divided into additional blocks, combined into fewer blocks, or eliminated, depending on the desired implementation.

Operation 802 may be the same as operation 602 of FIG. 6. Operation 804 may be the same as operation 604 of FIG. 6. Operation 806 may be the same as operation 606 of FIG. 6. Operation 808 may be the same as operation 608 of FIG. 6.

At operation 810, PCIe-port-configuration-state transitions may be managed to not transition from a first state corresponding to a polling-active state to a second state corresponding to a polling-compliance state. As a non-limiting example, PCIe-port-configuration-state transitions may be managed to prevent transition 514 from polling-active state 502 to polling-compliance state 504.

At operation 812, after a timeout, PCIe-port-configuration-state transitions may be managed to transition from the first state to a third state corresponding to a detect state. As a non-limiting example, PCIe-port-configuration-state transitions may be managed to cause transition 516 from polling-active state 502 to exit to detect state 510 (e.g., instead of transition 514 from polling-active state 502 to exit to detect state 510) after the timeout.

Figure 9:
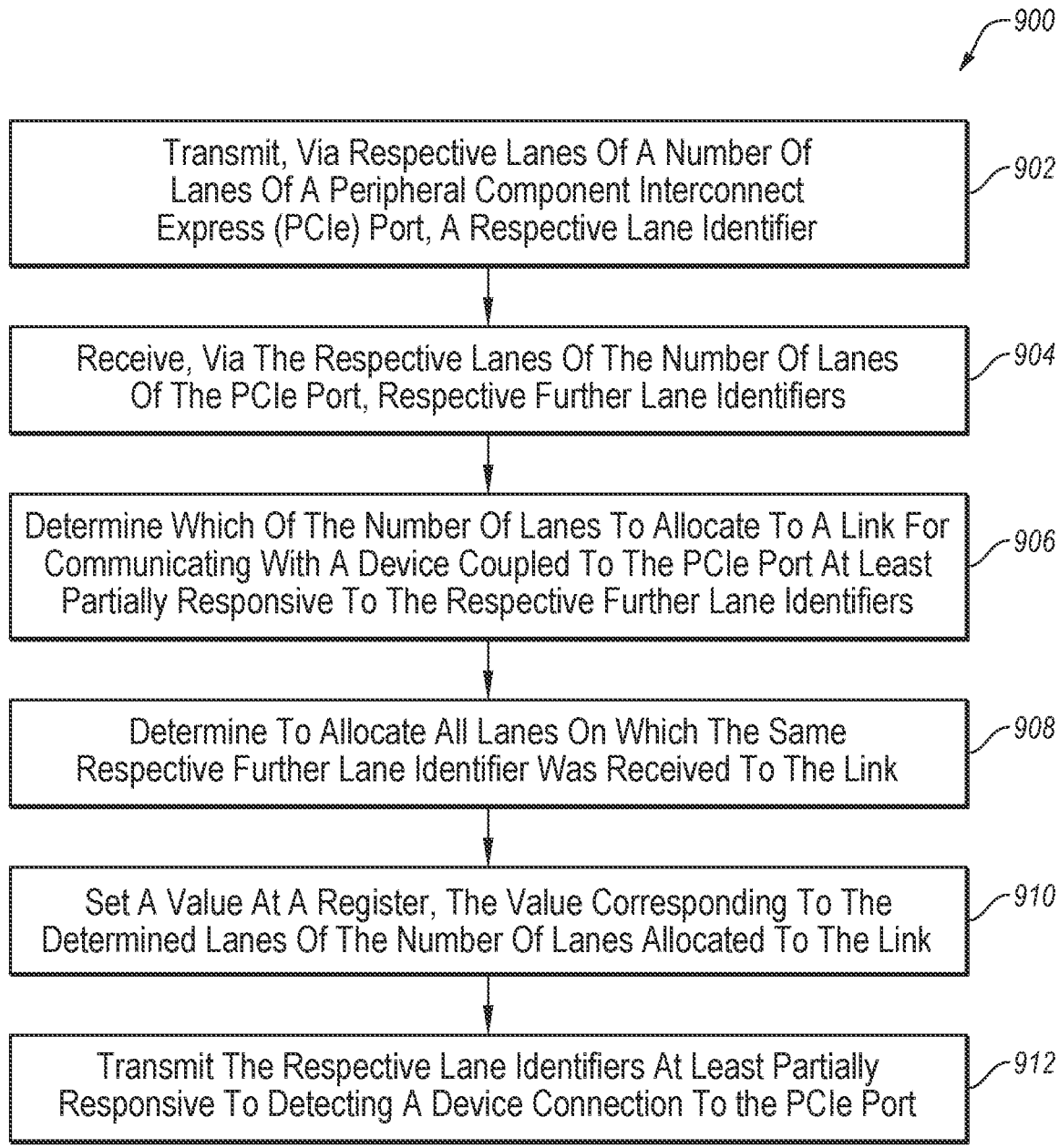
FIG. 9 illustrates an aspect of the subject matter in accordance with one embodiment.

FIG. 9 is a flowchart of an example method 900, in accordance with various examples of the disclosure. At least a portion of method 900 may be performed, in some examples, by a device or system, such as apparatus 100 of FIG. 1, logic 106, of FIG. 1, apparatus 200 of FIG. 2, logic 206, of FIG. 2, further logic 224 of FIG. 2, device 1000 of FIG. 10 or another device or system. Although illustrated as discrete blocks, various blocks may be divided into additional blocks, combined into fewer blocks, or eliminated, depending on the desired implementation.

Operation 902 may be the same as operation 602 of FIG. 6. Operation 904 may be the same as operation 604 of FIG. 6. Operation 906 may be the same as operation 606 of FIG. 6.

At operation 908, it may be determined that all lanes on which the same respective further lane identifier was received are to be allocated to the link. For example, lanes 316, on all of which the same further lane identifier may have been received, may be determined to be allocated to the same link.

At operation 910, a value may be set at a register. The value may correspond to the determined lanes of the number of lanes allocated to the link. Any of values 108 of FIG. 1 and values 208 of FIG. 2 may be examples of the values of method 900. Any of register 102 of FIG. 1 and register 202 of FIG. 2 may be examples of the register of method 900.

At operation 912, the respective lane identifiers may be transmitted at least partially responsive to detecting a device connection to the PCIe port. In some examples, the lane identifiers transmitted at operation 902 may be transmitted at least partially responsive to a device connection, e.g., as described by operation 912. As an example of operations, a device may be connected to a PCIe port of an example of the present disclosure. The example of the present disclosure may observe the connection and may transmit the lane identifiers responsive to the connection.

Modifications, additions, or omissions may be made to state diagram 400 of FIG. 4, state diagram 500 of FIG. 5, method 600 of FIG. 6, method 700 of FIG. 7, and method 800 of FIG. 8 method 900 of FIG. 9 without departing from the scope of the present disclosure. For example, the operations of method 600, method 700, method 800 and/or method 900 may be implemented in differing order. Furthermore, the outlined operations and actions are only provided as examples, and some of the operations and actions may be optional, combined into fewer operations and actions, or expanded into additional operations and actions without detracting from the essence of the disclosed example.

Figure 10:
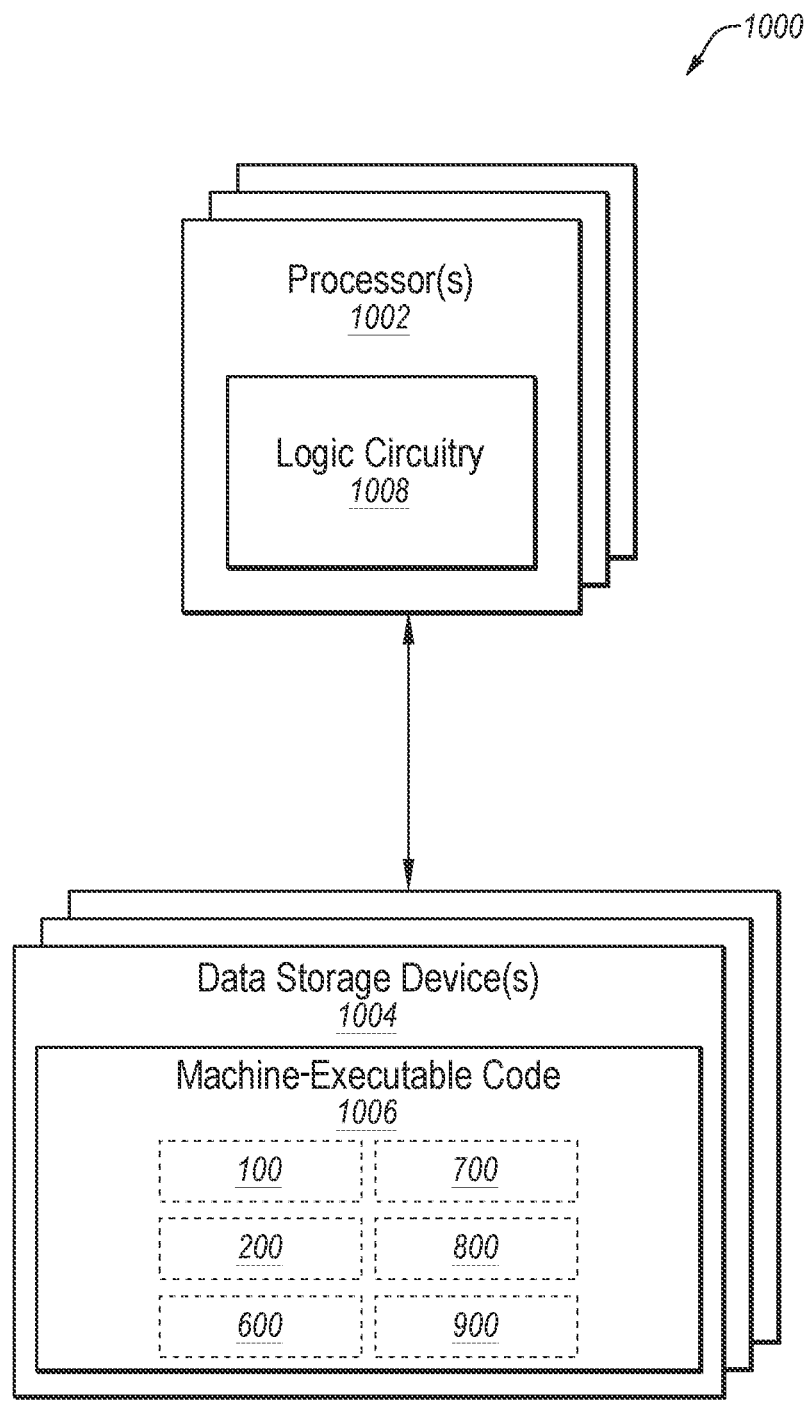
FIG. 10 illustrates a block diagram of an example device that may be used to implement various functions, operations, acts, processes, and/or methods, in accordance with one or more examples.

FIG. 10 is a block diagram of an example device 1000 that, in various examples, may be used to implement various functions, operations, acts, processes, and/or methods disclosed herein. Device 1000 includes one or more processors 1002 (sometimes referred to herein as "processors 1002") operably coupled to one or more apparatuses such as data storage devices (sometimes referred to herein as "storage 1004"), without limitation. Storage 1004 includes machine-executable code 1006 stored thereon (e.g., stored on a computer-readable memory) and processors 1002 include logic circuitry 1008. Machine-executable code 1006 include information describing functional elements that may be implemented by (e.g., performed by) logic circuitry 1008. Logic circuitry 1008 implements (e.g., performs) the functional elements described by machine-executable code 1006. Device 1000, when executing the functional elements described by machine-executable code 1006, should be considered as special purpose hardware may carry out the functional elements disclosed herein. In various examples, processors 1002 may perform the functional elements described by machine-executable code 1006 sequentially, concurrently (e.g., on one or more different hardware platforms), or in one or more parallel process streams.

When implemented by logic circuitry 1008 of processors 1002, machine-executable code 1006 may adapt processors 1002 to perform operations of examples disclosed herein. For example, machine-executable code 1006 may adapt processors 1002 to perform at least a portion or a totality of method 600 of FIG. 6, method 700 of FIG. 7, method 800, of FIG. 8, and/or method 900 of FIG. 9. As another example, machine-executable code 1006 may adapt processors 1002 to perform at least a portion or a totality of the operations discussed for apparatus 100 of FIG. 1, logic 106, of FIG. 1, apparatus 200 of FIG. 2, logic 206, of FIG. 2, further logic 224 of FIG. 2.

Processors 1002 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer executes computing instructions (e.g., software code) related to examples of the present disclosure. It is noted that a general-purpose processor (may also be referred to herein as a host processor or simply a host) may be a microprocessor, but in the alternative, processors 1002 may include any conventional processor, controller, microcontroller, or state machine. Processors 1002 may also be implemented as a combination of computing devices, such as a combination of a DSP and a microprocessor, a plurality of microprocessors, one or more microprocessors in conjunction with a DSP core, or any other such configuration.

In various examples, storage 1004 includes volatile data storage (e.g., random-access memory (RAM)), non-volatile data storage (e.g., Flash memory, a hard disc drive, a solid state drive, erasable programmable read-only memory (EPROM), without limitation). In various examples, processors 1002 and storage 1004 may be implemented into a single device (e.g., a semiconductor device product, a system on chip (SOC), without limitation). In various examples, processors 1002 and storage 1004 may be implemented into separate devices.

In various examples, machine-executable code 1006 may include computer-readable instructions (e.g., software code, firmware code). By way of non-limiting example, the computer-readable instructions may be stored by storage 1004, accessed directly by processors 1002, and executed by processors 1002 using at least logic circuitry 1008. Also by way of non-limiting example, the computer-readable instructions may be stored on storage 1004, transmitted to a memory device (not shown) for execution, and executed by processors 1002 using at least logic circuitry 1008. Accordingly, in various examples, logic circuitry 1008 includes electrically configurable logic circuitry.

In various examples, machine-executable code 1006 may describe hardware (e.g., circuitry) to be implemented in logic circuitry 1008 to perform the functional elements. This hardware may be described at any of a variety of levels of abstraction, from low-level transistor layouts to high-level description languages. At a high-level of abstraction, a hardware description language (HDL) such as an Institute of Electrical and Electronics Engineers (IEEE) Standard hardware description language (HDL) may be used, without limitation. By way of non-limiting examples, Verilog™, SystemVerilog™ or very large scale integration (VLSI) hardware description language (VHDL™) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of logic circuitry 1008 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in various examples, machine-executable code 1006 may include an HDL, an RTL, a GL description, a mask level description, other hardware description, or any combination thereof.

In examples where machine-executable code 1006 includes a hardware description (at any level of abstraction), a system (not shown, but including storage 1004) may implement the hardware description described by machine-executable code 1006. By way of non-limiting example, processors 1002 may include a programmable logic device (e.g., an FPGA or a PLC) and the logic circuitry 1008 may be electrically controlled to implement circuitry corresponding to the hardware description into logic circuitry 1008. Also by way of non-limiting example, logic circuitry 1008 may include hard-wired logic manufactured by a manufacturing system (not shown, but including storage 1004) according to the hardware description of machine-executable code 1006.

Regardless of whether machine-executable code 1006 includes computer-readable instructions or a hardware description, logic circuitry 1008 performs the functional elements described by machine-executable code 1006 when implementing the functional elements of machine-executable code 1006. It is noted that although a hardware description may not directly describe functional elements, a hardware description indirectly describes functional elements that the hardware elements described by the hardware description are capable of performing.

As used herein, the term "substantially" in reference to a given parameter, property, or condition means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, or even at least about 99% met.

As used in the present disclosure, the terms "module" or "component" may refer to specific hardware implementations may perform the actions of the module or component and/or software objects or software routines that may be stored on and/or executed by general purpose hardware (e.g., computer-readable media, processing devices, without limitation) of the computing system. In various examples, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different sub-combinations of some of the elements. For example, the phrase "A, B, C, D, or combinations thereof" may refer to any one of A, B, C, or D; the combination of each of A, B, C, and D; and any sub-combination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," without limitation).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, without limitation" or "one or more of A, B, and C, without limitation" is used, in general such a construction is intended to include A alone, B alone, C alone, A and B together, A and C together, B and C together, or A, B, and C together, without limitation.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additional non-limiting examples of the disclosure may include:

Example 1: A method comprising: transmitting, via respective lanes of a number of lanes of a peripheral component interconnect express (PCIe) port, a respective lane identifier; receiving, via the respective lanes of the number of lanes of the PCIe port, respective further lane identifiers; determining which of the number of lanes to allocate to a link for communicating with a device coupled to the PCIe port at least partially responsive to the respective further lane identifiers; and allocating the determined lanes of the number of lanes to the link.

Example 2: The method according to Example 1, comprising preventing a state transition for a time period to receive the respective further lane identifiers via the respective lanes of the number of lanes before allowing the state transition.

Example 3: The method according to any of Examples 1 and 2, wherein preventing the state transition for the time period comprises managing PCIe-port-configuration-state transitions to not transition from a first state corresponding to a detect state to a second state corresponding to a polling state.

Example 4: The method according to any of Examples 1 through 3, comprising, after the time period, causing the state transition and sending a signal.

Example 5: The method according to any of Examples 1 through 4, comprising causing the state transition in response to receiving the respective further lane identifiers via the respective lanes of the number of lanes.

Example 6: The method according to any of Examples 1 through 5, comprising managing PCIe-port-configuration-state transitions to not transition from a first state corresponding to a polling-active state to a second state corresponding to a polling-compliance state.

Example 7: The method according to any of Examples 1 through 6, wherein managing PCIe-port-configuration-state transitions to not transition from the first state to the second state comprises, after a timeout, managing PCIe-port-configuration-state transitions to transition from the first state to a third state corresponding to a detect state.

Example 8: The method according to any of Examples 1 through 7, wherein determining which of the number of lanes to allocate to the link comprises determining to allocate all lanes on which the same respective further lane identifier was received to the link.

Example 9: The method according to any of Examples 1 through 8, wherein the link comprises a first link, wherein the device comprises a first device, wherein the same respective further lane identifier comprises a first same respective further lane identifier and wherein the method comprises determining which of the number of lanes to allocate to a second link for communicating with a second device coupled to the PCIe port at least partially responsive to the respective further lane identifiers by determining to allocate all lanes on which a same second respective further lane identifier are received to the second link.

Example 10: The method according to any of Examples 1 through 9, wherein the allocating the determined ones of the number of lanes comprises setting a value at a register, the value corresponding to the determined lanes of the number of lanes allocated to the link.

Example 11: The method according to any of Examples 1 through 10, comprising transmitting the respective lane identifiers at least partially responsive to detecting a device connection to the PCIe port.

Example 12: An apparatus comprising: a register to store link identifiers for lanes of a peripheral component interconnect express (PCIe) port; logic coupled to the register to set values of the link identifiers, the logic to: transmit, via respective lanes of a number of lanes of the PCIe port, a respective lane identifier; receive, via the respective lanes of the number of lanes of the PCIe port, respective further lane identifiers; determine which of the number of lanes to allocate to a link for communicating with a device coupled to the PCIe port at least partially responsive to the respective further lane identifiers; and set a value of a respective link identifier stored at the register, the value at least partially responsive to the determined number of lanes allocated to the link.

Example 13: The apparatus according to Example 12, the logic to manage PCIe-port-configuration-state transitions to wait before transitioning from a first state corresponding to a detect to a second state corresponding to a polling state.

Example 14: The apparatus according to any of Examples 12 and 13, the logic is to wait between 1 millisecond and 4 milliseconds before transitioning form the first state to the second state.

Example 15: The apparatus according to any of Examples 12 through 14, the logic to manage PCIe-port-configuration-state transitions to, following a time period while in a first state corresponding to a polling-active state transition to a second state corresponding to a detect state.

Example 16: The apparatus according to any of Examples 12 through 15, wherein the logic is to determine which of the number of lanes to allocate to the link by determining to allocate all lanes on which the same respective further lane identifier was received to the link.

Example 17: The apparatus according to any of Examples 12 through 16, wherein the logic is further to transmit the respective lane identifiers at least partially responsive to detecting a device connection to the PCIe port.

Example 18: An apparatus comprising: a register to store link identifiers for lanes of a peripheral component interconnect express (PCIe) port; logic coupled to the register to set values of the link identifiers, the logic to: transmit, via respective lanes of a number of lanes of the PCIe port, a respective lane identifier; receive, via the number of lanes of the PCIe port, respective further lane identifiers; determine which of the number of lanes to allocate to a link for communicating with a device coupled to the PCIe port at least partially responsive to the respective further lane identifiers; and set a value of a respective link identifier stored at the register, the value at least partially responsive to the determined number of lanes allocated to the link; further logic coupled to the register to read values of the link identifiers, the further logic to: read the value of the respective link identifier stored at the register; and allocate the determined lanes of the number of lanes to the link at least partially responsive to the respective link identifier.

Example 19: The apparatus according to Example 18, the further logic to manage PCIe-port-configuration-state transitions to not transition from a first state corresponding to a detect to a second state corresponding to a polling state for a time period to receive a respective transmission on each of the number of lanes.

Example 20: The apparatus according to any of Examples 18 and 19, the further logic to manage PCIe-port-configuration-state transitions to not transition from a first state corresponding to a polling active state to a second state corresponding to a polling compliance state by, after a timeout, to transition from the first state to a third state corresponding to a detect state.

While the present disclosure has been described herein with respect to certain illustrated examples, those of ordinary skill in the art will recognize and appreciate that the present invention is not so limited. Rather, many additions, deletions, and modifications to the illustrated and described examples may be made without departing from the scope of the invention as hereinafter claimed along with their legal equivalents. In addition, features from one example may be combined with features of another example while still being encompassed within the scope of the invention as contemplated by the inventor.

What is claimed is:

1. A method, comprising:
    transmitting, via respective lanes of a peripheral component interconnect express (PCIe) port, respective unique lane identifiers;
    receiving, via the respective lanes of the PCIe port, respective further lane identifiers based on the transmitted unique lane identifiers;
    determining a number of devices coupled to the PCIe port at least partially based on a number of sets of like lane identifiers in the received respective further lane identifiers;
    responsive to determining that the determined number of devices coupled to the PCIe port exceeds a number of links that the PCIe port currently supports:
        determining which of the respective lanes of the PCIe port to allocate to respective links for communicating with respective devices of the determined number of devices coupled to the PCIe port at least partially based on respective sets of like lane identifiers in the received respective further lane identifiers;
        allocating the determined lanes to the respective links for communicating with respective devices; and
        initiate link training for the respective links for communicating with respective devices.

2. The method of claim 1, comprising preventing a state transition for a time period to receive the respective further lane identifiers via the respective lanes before allowing the state transition.

3. The method of claim 2, wherein preventing the state transition for the time period comprises managing PCIe-port-configuration-state transitions to not transition from a first state corresponding to a detect state to a second state corresponding to a polling state.

4. The method of claim 2, comprising, after the time period, causing the state transition and sending a signal.

5. The method of claim 2, comprising causing the state transition in response to receiving the respective further lane identifiers via the respective lanes.

6. The method of claim 1, comprising managing PCIe-port-configuration-state transitions to not transition from a first state corresponding to a polling-active state to a second state corresponding to a polling-compliance state.

7. The method of claim 6, wherein managing PCIe-port-configuration-state transitions to not transition from the first state to the second state comprises, after a timeout, managing PCIe-port-configuration-state transitions to transition from the first state to a third state corresponding to a detect state.

8. The method of claim 1, wherein determining which of the respective lanes of the PCIe port to allocate to the link comprises determining to allocate all lanes on which the same respective further lane identifier was received to the link.

9. The method of claim 8, wherein the link comprises a first link, wherein the device comprises a first device, wherein the same respective further lane identifier comprises a first same respective further lane identifier and wherein the method comprises determining which of the respective lanes of the PCIe port to allocate to a second link for communicating with a second device coupled to the PCIe port at least partially responsive to the respective further lane identifiers by determining to allocate all lanes on which a same second respective further lane identifier are received to the second link.

10. The method of claim 1, wherein the allocating the determined ones of the respective lanes comprises setting a value at a register, the value corresponding to the determined lanes of the respective lanes allocated to the link.

11. The method of claim 1, comprising transmitting the respective lane identifiers at least partially responsive to detecting a device connection to the PCIe port.

12. An apparatus comprising:
    a register to store link identifiers for lanes of a peripheral component interconnect express (PCIe) port;
    logic coupled to the register to set values of the link identifiers, the logic to:
        transmit, via respective lanes of the PCIe port, respective unique lane identifiers;
        receive, via the respective lanes of the PCIe port, respective further lane identifiers based on the transmitted unique lane identifiers;
        determine a number of devices coupled to the PCIe port at least partially based on a number of sets of like lane identifiers in the received respective further lane identifiers;
        responsive to determining that the determined number of devices coupled to the PCIe port exceeds a number of links that the PCIe port currently supports:
            determine which of the respective lanes of the PCIe port to allocate to respective links for communicating with respective devices of the determined number of devices coupled to the PCIe port at least partially based on respective sets of like lane identifiers in the respective further lane identifiers; and
            set respective values of the link identifiers stored at the register, the set values at least partially based on the like lane identifiers in the received respective further lane identifiers.

13. The apparatus of claim 12, the logic to manage PCIe-port-configuration-state transitions to wait before transitioning from a first state corresponding to a detect to a second state corresponding to a polling state.

14. The apparatus of claim 13, the logic is to wait between 1 millisecond and 4 milliseconds before transitioning form the first state to the second state.

15. The apparatus of claim 12, the logic to manage PCIe-port-configuration-state transitions to, following a time period while in a first state corresponding to a polling-active state transition to a second state corresponding to a detect state.

16. The apparatus of claim 12, wherein the logic is to determine which of the respective lanes to allocate to the link by determining to allocate all lanes on which the same respective further lane identifier was received to the link.

17. The apparatus of claim 12, wherein the logic is further to transmit the respective lane identifiers at least partially responsive to detecting a device connection to the PCIe port.

18. The apparatus of claim 12, comprising:
further logic coupled to the register to read values of the link identifiers, the further logic to:
read the respective values of the respective link identifiers stored at the register; and
allocate the determined lanes to the respective links for communicating with respective devices.

19. The apparatus of claim 18, the further logic to manage PCIe-port-configuration-state transitions to not transition from a first state corresponding to a detect to a second state corresponding to a polling state for a time period to receive a respective transmission on each of the number of lanes.

20. The apparatus of claim 18, the further logic to manage PCIe-port-configuration-state transitions to not transition from a first state corresponding to a polling active state to a second state corresponding to a polling compliance state by, after a timeout, to transition from the first state to a third state corresponding to a detect state.

* * * * *

UNITED STATES PATENT AND TRADEMARK OFFICE
CERTIFICATE OF CORRECTION

| | | |
|---|---|---|
| PATENT NO. | : 12,056,071 B2 | |
| APPLICATION NO. | : 17/817906 | |
| DATED | : August 6, 2024 | |
| INVENTOR(S) | : Eric Son et al. | |

It is certified that error appears in the above-identified patent and that said Letters Patent is hereby corrected as shown below:

In the Specification

Column 7, Line 20, change "of "0" fora link" to --of "0" for a link--

Signed and Sealed this
Fifth Day of November, 2024

Katherine Kelly Vidal
*Director of the United States Patent and Trademark Office*